(12) United States Patent
Lin et al.

(10) Patent No.: US 8,457,779 B2
(45) Date of Patent: Jun. 4, 2013

(54) MULTI-TRACK HANDLING AND STORAGE APPARATUS AND METHOD THEREOF

(75) Inventors: Huan-Cheng Lin, Taipei County (TW); Jung-Pin Lai, Taipei County (TW)

(73) Assignee: Inotera Memories, Inc., Taoyuan County (TW)

( * ) Notice: Subject to any disclaimer, the term of this patent is extended or adjusted under 35 U.S.C. 154(b) by 458 days.

(21) Appl. No.: 12/782,114

(22) Filed: May 18, 2010

(65) Prior Publication Data

US 2011/0081222 A1 Apr. 7, 2011

(30) Foreign Application Priority Data

Oct. 2, 2009 (TW) .............................. 98133520 A

(51) Int. Cl.
*B65G 1/04* (2006.01)
(52) U.S. Cl.
USPC ..... 700/214; 104/130.01; 104/89; 198/345.3; 414/140.3; 414/273; 700/213
(58) Field of Classification Search
USPC ........................................................ 700/214
See application file for complete search history.

(56) References Cited

U.S. PATENT DOCUMENTS

| | | | |
|---|---|---|---|
| 5,002,449 A * | 3/1991 | Kita et al. | 414/273 |
| 6,539,876 B1 * | 4/2003 | Campbell et al. | 104/130.01 |
| 7,921,782 B2 * | 4/2011 | Keller et al. | 104/89 |
| 8,036,771 B2 * | 10/2011 | Hayashi | 700/213 |
| 8,127,687 B2 * | 3/2012 | Spangler et al. | 104/89 |
| 2003/0125834 A1 * | 7/2003 | Campbell et al. | 700/214 |
| 2004/0149158 A1 * | 8/2004 | Keller et al. | 104/89 |
| 2006/0182526 A1 * | 8/2006 | Weis | 414/140.3 |
| 2006/0276930 A1 * | 12/2006 | Tsujimoto et al. | 700/214 |
| 2009/0277747 A1 * | 11/2009 | Spangler et al. | 198/345.3 |

* cited by examiner

*Primary Examiner* — Gene Crawford
*Assistant Examiner* — Kyle Logan
(74) *Attorney, Agent, or Firm* — Rosenberg, Klein & Lee

(57) ABSTRACT

A multi-track handling and storage apparatus includes at least two main tracks, at least two cranes and an intelligent integrated logic system. The main tracks are arranged separately, and every two adjacent main tracks are connected by at least one switching track. Bottoms of the cranes are slidably disposed on the main tracks. The intelligent integrated logic system includes a command receiving unit, a database unit, an analyzing unit, a crane dispatching unit and a route selection unit which are integrated with each other. The above-mentioned main tracks, switching tracks and cranes are controlled by the units of the intelligent integrated logic system. The present invention further provides a multi-track handling and storage method.

4 Claims, 6 Drawing Sheets

MULTI-TRACK HANDLING AND STORAGE APPARATUS AND METHOD THEREOF

BACKGROUND OF THE INVENTION

1. Field of the Invention

The present invention relates to a multi-track handling and storage apparatus and method thereof, and more particularly to a multi-track handling and storage apparatus and method thereof which can effectively increase the amount of transport, improve transport efficiency and avoid that some members are in an idle state.

2. Description of Related Art

In modern storage technologies, automatic storage apparatus automatically transport stored articles to reduce the possibility of human error, handle articles rapidly and correctly and execute storage management reasonably.

However, as shown in FIG. 1, a conventional automatic storage apparatus only has a single track 1a, and cranes 2a are limited to move along the single track 1a. Even if there are many groups of cranes 2a, they can only work on the same track 1a. In the example, the apparatus has two cranes 2a, and an isolation region 11a, which the two cranes 2a cannot arrive at, must be formed in the track 1a to avoid that the two cranes 2a collide with each other. The width of the isolation region 11a is similar to that of one crane 2a to ensure the safe distance between the two cranes 2a. Since the cranes 2a cannot arrive at the isolation region 11a, a storehouse 3a cannot be disposed in the position adjacent to the isolation region 11a, which forms an idle space 31a, thereby causing the waste of space. Furthermore, the scope in which each crane 2a can move is limited and the two cranes 2a cannot support each other, and even it is possible that one of the cranes 2 is busying, and the other is in the idle state, so that the transport is inefficient.

Hence, the inventors of the present invention believe that the shortcomings described above are able to be improved and finally suggest the present invention which is of a reasonable design and is an effective improvement based on deep research and thought.

SUMMARY OF THE INVENTION

A main objective of the present invention is to provide a multi-track handling and storage apparatus and method thereof which can increase the number of tracks and cranes according to use demands and combine with an intelligent integrated logic system which can automatically analyze transport instruction and control tracks and cranes, thereby increasing the amount of transport, improving transport efficiency and avoiding that the cranes are in an idle state.

To achieve the above-mentioned object, a multi-track handling and storage apparatus in accordance with the present invention is provided. The multi-track handling and storage apparatus includes: at least two main tracks arranged separately, every two adjacent main tracks connected by at least one switching track; at least two cranes, of which bottoms are slidably disposed on the main tracks; and an intelligent integrated logic system which includes a command receiving unit, a database unit, an analyzing unit, a crane dispatching unit and a route selection unit which are integrated with each other, wherein the command receiving unit is electrically connected with the analyzing unit, the analyzing unit is electrically connected with the database unit, the crane dispatching unit, and the route selection unit, wherein the crane dispatching unit and the route selection unit are electrically connected with each other, the crane dispatching unit is electrically connected with the cranes; and the route selection unit is connected with the main tracks and the switching tracks.

The present invention further provides a multi-track handling and storage method. The method includes the steps of:

a command receiving unit receiving a transport instruction from the outside and sending the transport instruction to an analyzing unit;

the analyzing unit analyzing the transport instruction and reading data including position data of cranes and position data of storehouses in a database unit;

the analyzing unit sending an analyzed result of the transport instruction to a crane dispatching unit and a route selection unit;

the route selection unit providing the optimal route data and executing a track bifurcation operation between main tracks and switching tracks;

the crane dispatching unit designating the most suitable crane to execute the transport instruction;

sending the message that the transport instruction has been executed to the analyzing unit;

the analyzing unit reading original position data of the crane which has executed the transport instruction in the database unit; and the analyzing unit sending a crane returning instruction to the crane dispatching unit and the crane dispatching unit executes the crane returning instruction so that the crane which has executed the transport instruction returns to its original position.

Basing on the combination of the hardware construction having a plurality of groups of cranes and tracks and the software construction having the intelligent integrated logic system, the multi-track handling and storage apparatus and method of the present invention can self-analyze the transport instruction, automatically adjust the configuration and distribution of the cranes, avoid the collision of the cranes, automatically decide the optimal transport route and switching tracks, thereby increasing the amount of transport, optimizing the transport efficiency and avoiding that the cranes are in an idle state.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

Figure 1:
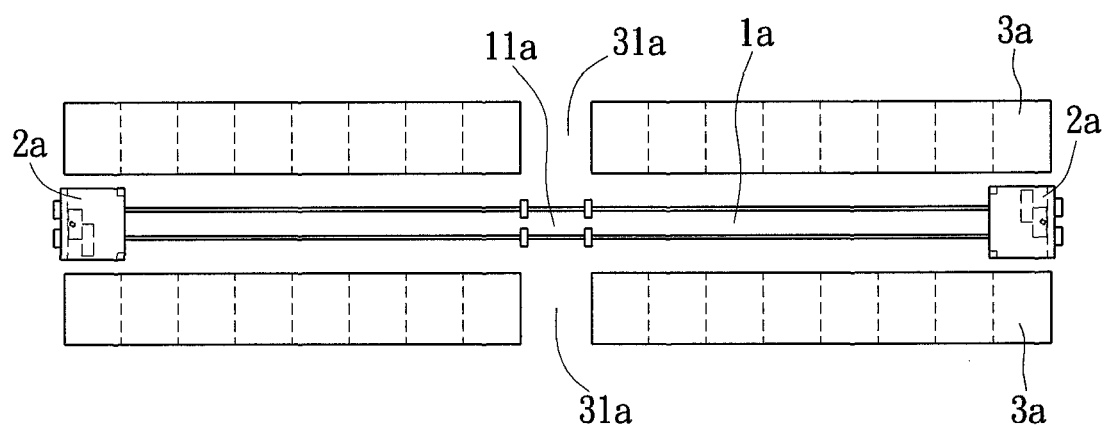
FIG. 1 is a top view of a conventional automatic storage apparatus.

Please refer to FIGS. 2A, 2B, 2C and FIG. 3 illustrating a multi-track handling and storage apparatus in accordance with the present invention, which has a hardware construction and a software construction cooperating with each other, wherein the hardware construction is in the control of the software construction.

The hardware construction includes at least two main tracks 1, at least two cranes 2 and a plurality of storehouses 3. The main tracks 1 are parallel to each other and arranged horizontally separately. Every two adjacent main tracks 1 are connected by at least one switching track 11, and the connecting points of the main tracks 1 and the switching tracks 11 can be switched depending on demands so as to switch the routes of the tracks. The bottoms of the cranes 2 are slidably disposed on the main tracks 1, and each main track 1 has at least one exclusive crane 2. The cranes 2 may slide on the main tracks 1, and may be switched from the original main tracks 1 onto other main tracks 1 via the switching tracks 11 depending on demands. The storehouses 3 are horizontally arranged along one side or two sides of the main tracks 1 and stacked in a vertical direction. The storehouses 3 are all in the range of the cranes 2.

Figure 2A:
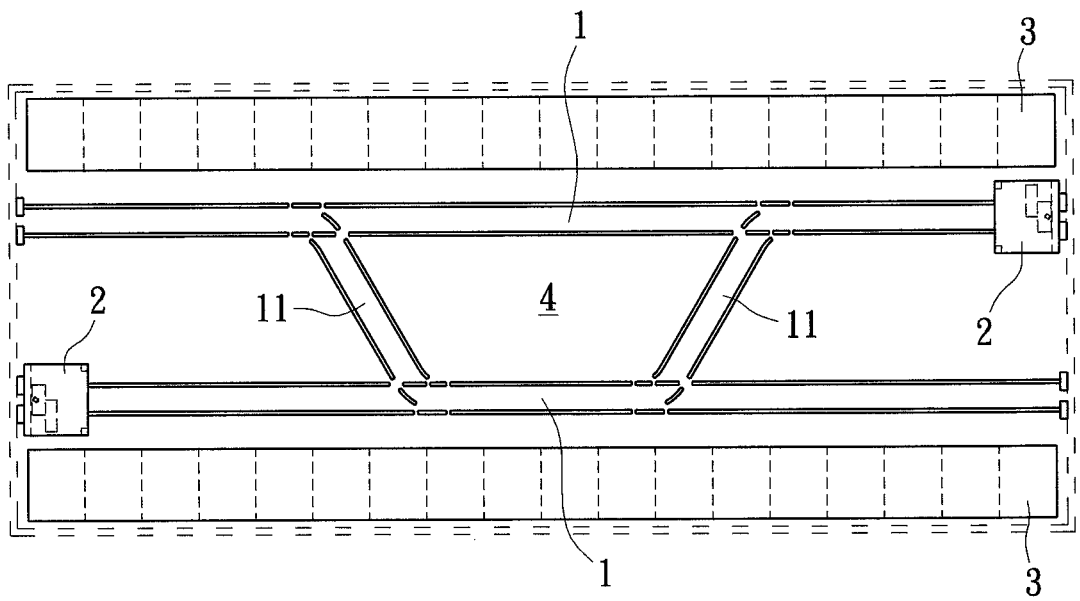
FIG. 2A is a top view of a first embodiment of a multi-track handling and storage apparatus of the present invention.
Figure 2B:
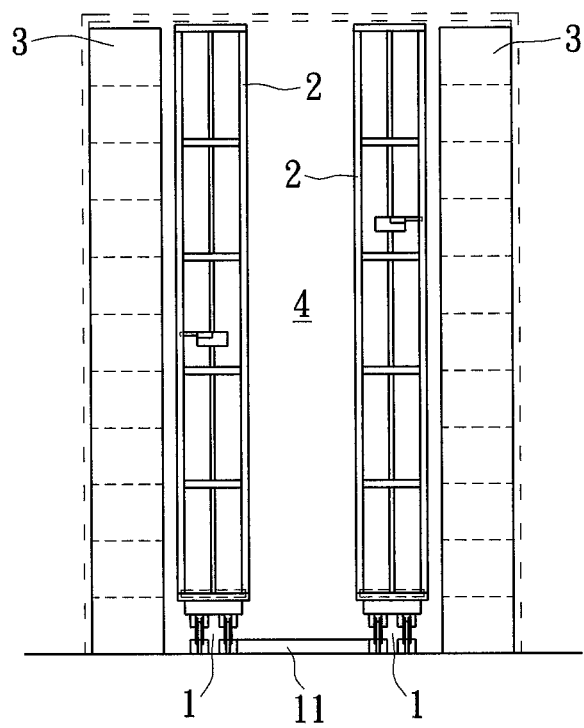
FIG. 2B is a side view of the first embodiment of the multi-track handling and storage apparatus of the present invention.
Figure 2C:
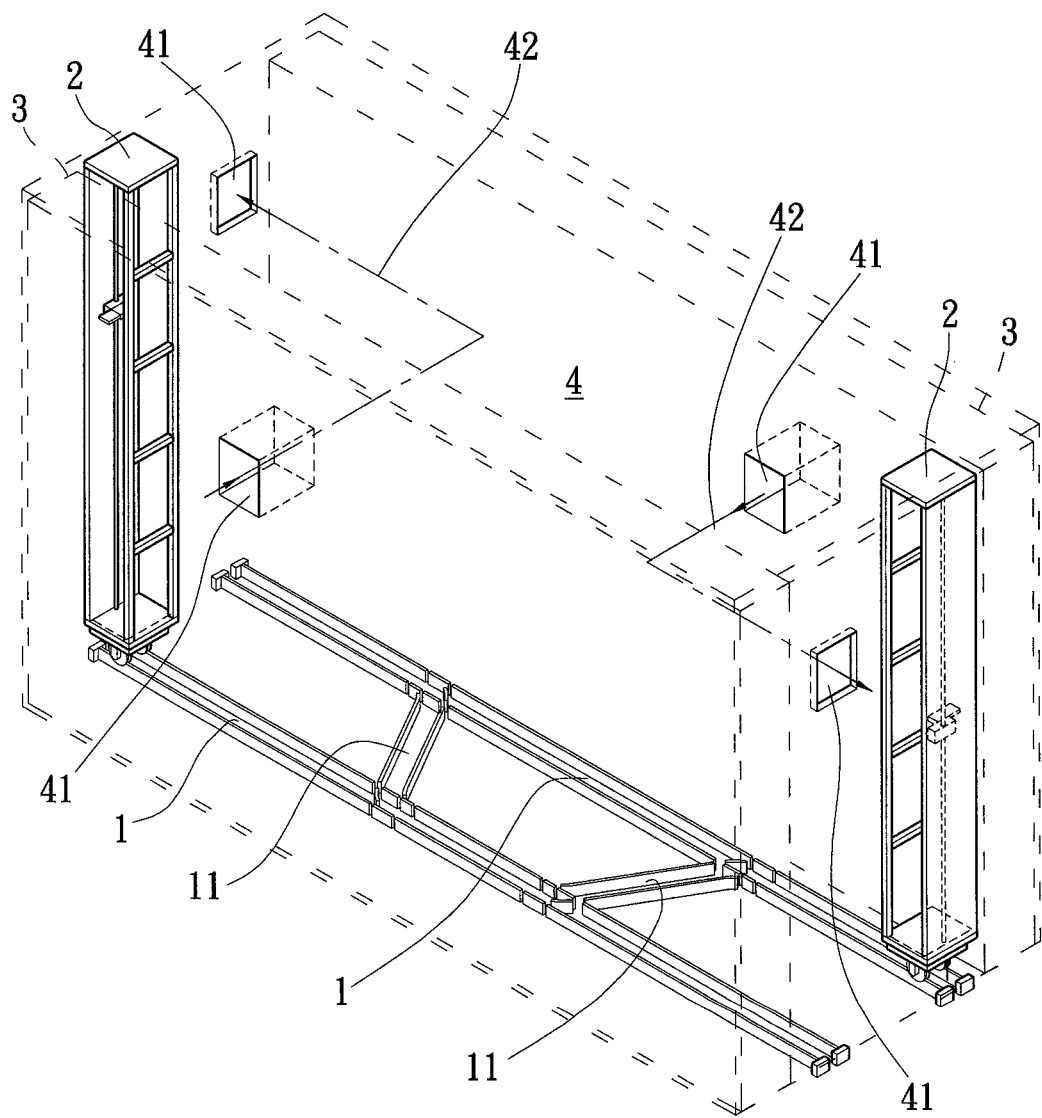
FIG. 2C is a perspective view of the first embodiment of the multi-track handling and storage apparatus of the present invention.

As shown in FIGS. 2A, 2B and 2C illustrating a first embodiment of the multi-track handling and storage apparatus of the present invention which has two main tracks 1. The two main tracks 2 are connected by two switching tracks 11, and each main track 1 has one exclusive crane 2. A plurality of storehouses 3 is disposed on one side of each main track 1. When the crane 2 of one of the main track 1 carries too many articles, the crane 2 of the other main track 2 may be switched to share in the work via the switching tracks 11, thereby improving transport efficiency.

Figure 3:
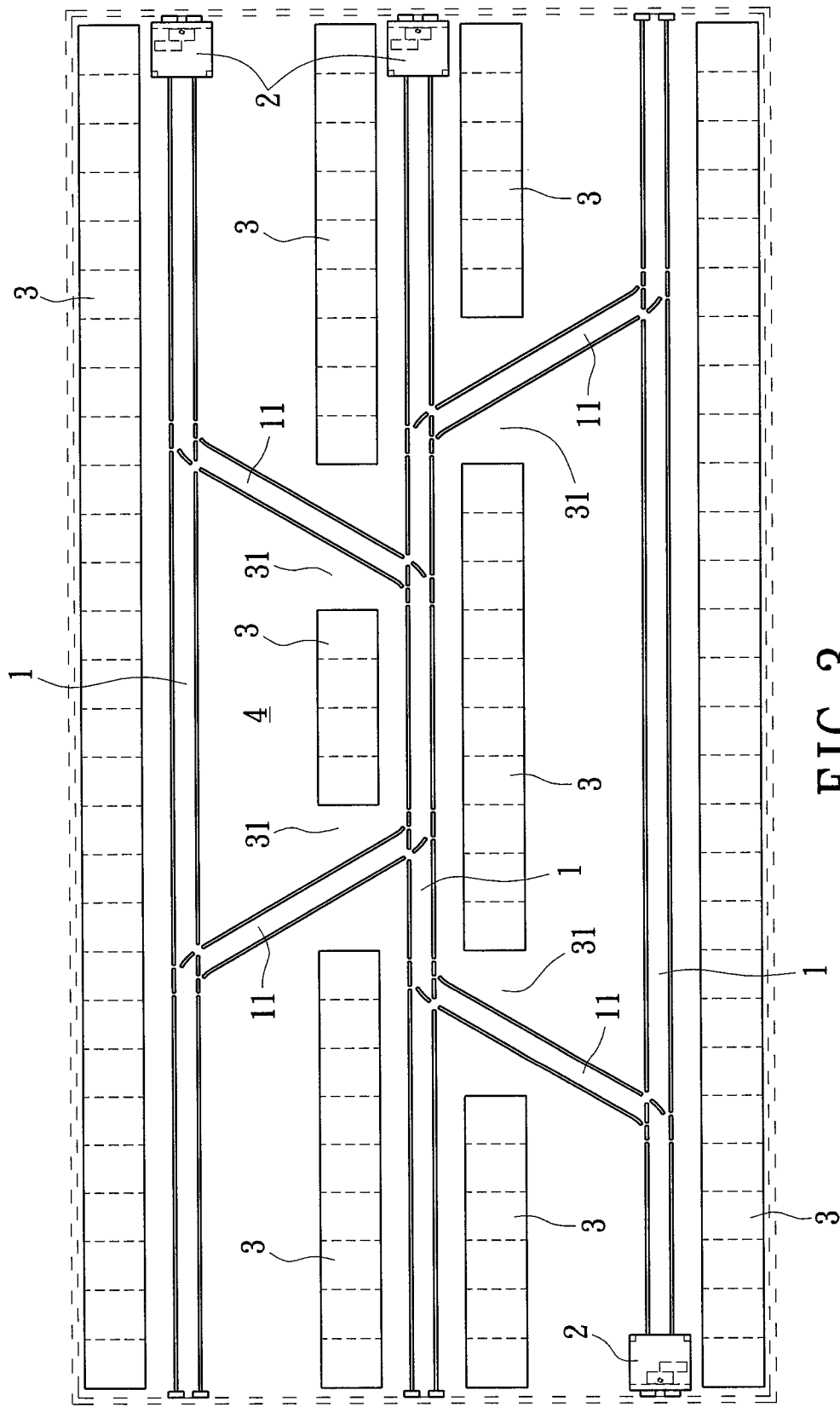
FIG. 3 is a top view of a second embodiment of the multi-track handling and storage apparatus of the present invention.

As shown in FIG. 3 illustrating a second embodiment of the multi-track handling and storage apparatus of the present invention which has three main tracks 1. Every two adjacent main tracks 1 are connected by two switching tracks 11, and each main track 1 has one exclusive crane 2. A plurality of storehouses 3 is disposed on one side of each of the two outside main tracks 1 and the two sides of the inside main track 1. However, reserved spaces 31 need to be kept in the intersection regions of the switching tracks 11 and the storehouses 3 so as to allow passing of the switching tracks 11.

The number and configuration of the mail tracks 1, the switching tracks 11, the cranes 2 and the storehouses 3 can be altered depending on demands, not limited in the above-mentioned embodiments.

As shown in FIG. 2C, the spaces among the above main tracks 1, the cranes 2 and the storehouses 3 form a transport space 4. The transport space 4 is slightly a cube, and has a plurality of entrances 41 located around the transport space 4. A plurality of transport devices 42 enters the transport space 4 through the entrances 41. The transport devices 42 transport articles to be stored into the transport space 4 through the entrances 41 from the outside, and then the cranes 2 transport the articles into the storehouses 3 for being stored. The number and configuration of the entrances 41 and the transport devices 42 is not limited herein.

Figure 4:
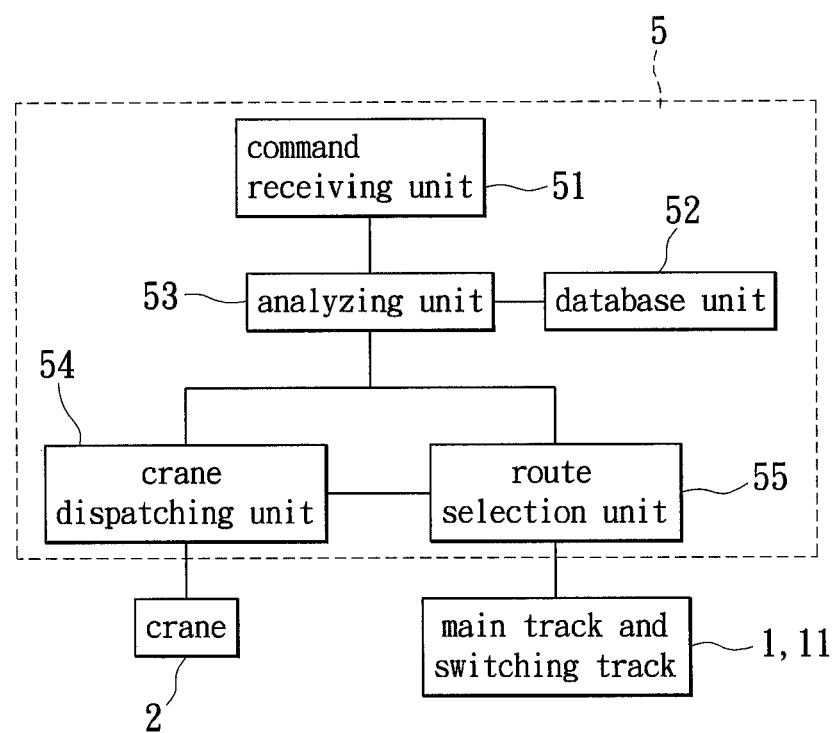
FIG. 4 is a view showing an electrical connection relationship of an intelligent integrated logic system of the multi-track handling and storage apparatus of the present invention.

As shown in FIG. 4, the software construction of the multi-track handling and storage apparatus of the present invention is an intelligent integrated logic system 5 which is formed by integrating a plurality of units including a command receiving unit 51, a database unit 52, an analyzing unit 53, a crane dispatching unit 54 and a route selection unit 55. The command receiving unit 51 is electrically connected with the analyzing unit 53, the analyzing unit 53 is electrically connected with the database unit 52, the crane dispatching unit 54 and the route selection unit 55, and the crane dispatching unit 54 and the route selection unit 55 are electrically connected with each other. Additionally, the crane dispatching unit 54 is electrically connected with the cranes 2, and the route selection unit 55 is electrically connected with the main tracks 1 and the switching tracks 11. Accordingly, the above-mentioned main tracks 1, switching tracks 11 and cranes 2 may be controlled by the units of the intelligent integrated logic system 5 to achieve the optimal transport efficiency.

Figure 5:
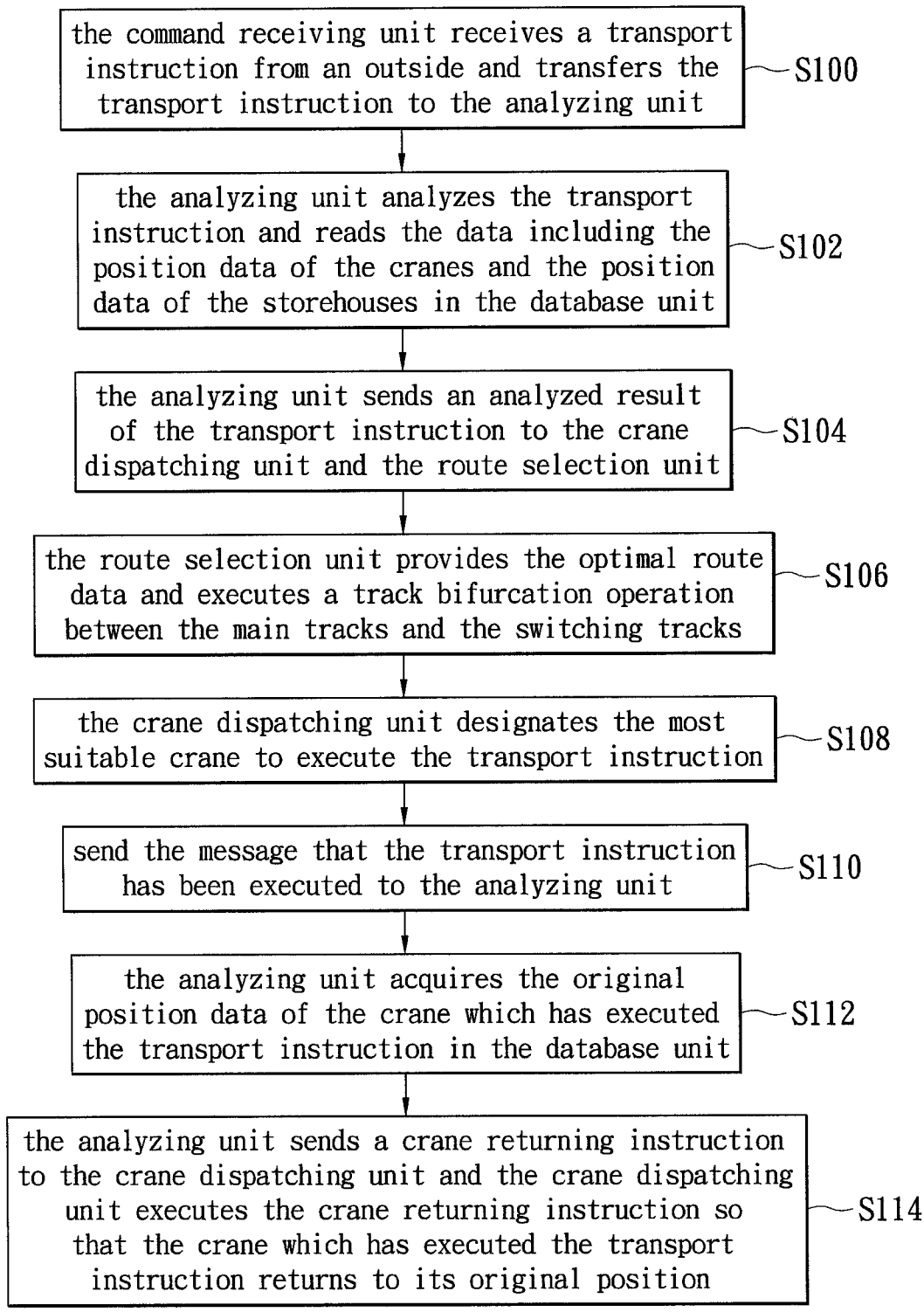
FIG. 5 is a flow chart of a multi-track handling and storage method of the present invention.

Please refer to FIG. 5, combining with the above-mentioned hardware and software constructions, the present invention further provides a multi-track handling and storage method which includes the steps as follows:

Step S100, firstly, the command receiving unit 51 receives a transport instruction from the outside and sends the transport instruction to the analyzing unit 53.

Step S102, the analyzing unit 53 analyzes the transport instruction, which includes analyzing the relative positions of the cranes 2 and the entrances 41 and reading the data including the position data of the cranes 1 and the position data of the storehouses 3 in the database unit 5.

Step S104, the analyzing unit 53 sends an analyzed result of the transport instruction to the crane dispatching unit 54 and the route selection unit 55 simultaneously.

Step S106, the route selection unit 55 provides the optimal route data which is the shortest transport route and executes a track bifurcation operation between the special main tracks 1 and the special switching tracks 11 to achieve the optimal route.

Step S108, the crane dispatching unit 54 designates the most suitable crane 2 to execute the transport instruction and prevents the most suitable crane 2 from colliding with other cranes 2 which are executing other transport instructions. The designated crane 2 transports the articles into a special storehouse 3 along the optimal route where the track bifurcation operation has been done from a special entrance 41 for being stored. So the transport instruction has been executed.

Step S110, send the message that the transport instruction has been executed to the analyzing unit 53.

Step S112, the analyzing unit 53 reads the original position data of the crane 2 which has executed the transport instruction in the database unit 52.

Step S114, the analyzing unit 53 sends a crane returning instruction to the crane dispatching unit 54 and the crane dispatching unit 54 executes the crane returning instruction so that the crane 2 which has executed the transport instruction returns to its original position.

Accordingly, basing on the combination of the hardware construction having the plurality of groups of switchable cranes 2 and tracks and the software construction having the intelligent integrated logic system 5, the multi-track handling and storage apparatus and method of the present invention can self-analyze the transport instruction, automatically adjust the configuration and distribution of the cranes 2, avoid the collision of the cranes 2, automatically decide the optimal transport route and switching tracks, thereby increasing the amount of transport, optimizing the transport efficiency and avoiding that the cranes are in an idle state.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A multi-track handling and storage method, comprising the steps of:
    receiving a transport instruction from an outside by a command receiving unit and sending the transport instruction to an analyzing unit;
    analyzing the transport instruction by the analyzing unit and reading data including position data of cranes and position data of storehouses in a database unit;
    sending an analyzed result of the transport instruction by the analyzing unit to a crane dispatching unit and a route selection unit;
    providing the optimal route data and executing a track bifurcation operation between main tracks and switching tracks by the route selection unit;
    designating the most suitable crane to execute the transport instruction by the crane dispatching unit, and the crane dispatching unit sends a message that the transport instruction has been executed to the analyzing unit; and
    acquiring original position data of the crane which has executed the transport instruction in the database unit by analyzing unit.

2. The multi-track handling and storage method as claimed in claim 1, wherein after the analyzing unit acquires the original position data of the crane, the analyzing unit sends a crane returning instruction to the crane dispatching unit and the crane dispatching unit executes the crane returning instruction so that the crane returns to its original position.

3. The multi-track handling and storage method as claimed in claim 1, wherein the analyzing unit analyzes the transport instruction, which includes analyzing the relative positions of the cranes and the entrances.

4. The multi-track handling and storage method as claimed in claim 1, wherein the most suitable crane designated by the crane dispatching unit transports articles into the storehouses along the optimal route where the track bifurcation operation has been done from the entrances for being stored.

* * * * *